US008850412B2

(12) United States Patent
Bovet et al.

(10) Patent No.: US 8,850,412 B2
(45) Date of Patent: Sep. 30, 2014

(54) SYSTEM AND METHOD FOR USING ASPECTS TO GENERATE EVENT DATA RECORDS

(75) Inventors: Jean Bovet, Menlo Park, CA (US); Boris Selitser, Castro Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1158 days.

(21) Appl. No.: 12/466,207

(22) Filed: May 14, 2009

(65) Prior Publication Data

US 2010/0005477 A1    Jan. 7, 2010

Related U.S. Application Data

(60) Provisional application No. 61/077,416, filed on Jul. 1, 2008.

(51) Int. Cl.
*G06F 9/45*    (2006.01)
*G06F 9/44*    (2006.01)

(52) U.S. Cl.
CPC ..................................... *G06F 8/316* (2013.01)
USPC ........................... 717/140; 717/148; 717/114

(58) Field of Classification Search
None
See application file for complete search history.

(56) References Cited

U.S. PATENT DOCUMENTS

| 5,892,917 | A | 4/1999 | Myerson |
| 6,456,707 | B2 * | 9/2002 | Erb .......................... 379/201.03 |
| 6,678,518 | B2 | 1/2004 | Eerola |
| 6,822,954 | B2 | 11/2004 | McConnell et al. |
| 7,207,048 | B2 | 4/2007 | McQuillan et al. |
| 7,398,426 | B2 * | 7/2008 | Colyer .......................... 717/116 |
| 2003/0079032 | A1 | 4/2003 | Orsolits et al. |
| 2007/0180101 | A1 * | 8/2007 | Chen et al. ..................... 709/224 |

OTHER PUBLICATIONS

"Overview of the PPC Gateway server," CICS Intercommunication Guide, http:publib.boulder.ibm.com/infocenter/txformp/v6r0m0/topic/com.ibm.cics.te.doc/erziad0065.htm, Nov. 14, 2008, 4 pages.
"Deploying and Using the CrossTec Gateway," CrossTec Corporation, White Paper, 15 pages (2006).
"Configuring Access Gateway Logging," Novell Doc: Novell Access Manager 3.0 SP4 Administration Guide, http://www.novell.com/documentation/novellaccessmanager/adminguide/data/b3ikfwn.html, Nov. 14, 2008, 8 pages.

(Continued)

*Primary Examiner* — Qamrun Nahar
(74) *Attorney, Agent, or Firm* — Meyer IP Law Group (57) ABSTRACT

Methods and systems are described for generating event data records by using aspects. Cross cutting concerns are applied in order to generate the EDRs. In various embodiments, the EDRs are generated within a gateway or another type of software application that processes various communications. In processing data, the gateway can generate data records, which capture information regarding traffic flow within the gateway. The event data records are generated at various points in the gateway by using an aspect to weave code at compile time. Once generated, the EDRs can be picked up by an external listener and filtered based on various criteria, such as Java type-based filtering and classification. The listener can use predefined filtering coming from the gateway or customize the filtering according to specific needs. The EDRs can also be classified by using a configuration file, which can be modified without altering any programming code within the gateway.

19 Claims, 4 Drawing Sheets

(56) References Cited

OTHER PUBLICATIONS

"Ozeki NG SMS Gateway—Product Guide," Receive SMS on a Website (PHP)—The SMS Gateway Guide, http://www.ozekisms.com/php-sms-api-receive-sms-in-php/index_p_php_q_ow_page_number_e_324opt.html, Nov. 14, 2008, 7 pages.

"An Email/HTTP Gateway Service for SOAP, Version 1.0," White Mesa Software, The White Mesa Email/HTTP Gateway Implementation for SOAP, http://www.whitemesa.com/wmsoapgw_about.htm, Nov. 14, 2008, 5 pages.

* cited by examiner

SYSTEM AND METHOD FOR USING ASPECTS TO GENERATE EVENT DATA RECORDS

CLAIM OF PRIORITY

The present application claims the benefit of U.S. Provisional Patent Application No. 61/077,416 entitled SYSTEM AND METHOD FOR USING ASPECTS TO GENERATE EVENT DATA RECORDS WITHIN A TELECOMMUNICATION SERVICE ACCESS GATEWAY, filed on Jul. 1, 2008, which application is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to event tracking and data records, and more particularly to using aspects in order to generate event data records (EDRs), such as within a telecommunications gateway.

BACKGROUND

With the ever-increasing popularity of the World Wide Web, more and more previously unrelated technologies are becoming integrated with the enormous network of information and functionality that the internet provides. Everything from television and radio to books and encyclopedias are becoming available online, amongst a wide variety of other technologies. One such area of technology is telephony and the related telecommunications services.

Conventionally, telecommunications and network infrastructure providers have relied on often decades-old switching technology to providing routing for network traffic. Businesses and consumers, however, are driving industry transformation by demanding new converged voice, data and video services. The ability to meet these demands can often be limited by existing IT and network infrastructures that are closed, proprietary and too rigid to support these next generation services. As a result, telecommunications companies have been transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

Delivering these more sophisticated data services has proved to be more difficult than first imagined. Existing IT and network infrastructures, closed proprietary network-based switching fabrics and the like have proved to be too complex and too rigid to allow the creation and deployment of new service offerings.

While the worlds of TCP/IP applications and of telephony networks continue to converge, the relationship between them has often been overly complex and difficult to manage for various organizations, as well as for consumers. In recent times, specialized telecommunication servers and various service gateways have emerged to enable simpler ways for developers to include telephony-based functionality in their software applications, as well as provide increased security and stability. Nevertheless, these specialized solutions continue to need improvements in performance generally required by network operators and demanded by their subscribers.

One such area for improvement involves the tracking of events and other data during request processing time at the gateway level by a network operator. In many instances, it can be desirable to generate events and to capture information regarding runtime processing of various communications that are flowing through a gateway. This information can then be used to measure performance, track errors in operations, perform charging operations, implement additional functionality and conduct other business-related activities by the network operator. In the past, capturing such event data has been performed by implementing some form of alarms, data records or other similar mechanism within the server or application. However, the code necessary to implement such information tracking has generally been cumbersome to implement, tedious to change and generally inefficient. What is needed is an improved approach that allows for separation of concerns and better delineation of responsibilities between code implementing traffic processing and code generating associated events.

SUMMARY OF THE INVENTION

Methods and systems are described for generating event data records by using aspects. Cross cutting concerns are applied in order to generate the EDRs. In various embodiments, the EDRs are generated within a gateway or another type of software application that processes various communications. In processing data, the gateway can generate data records, which capture information regarding traffic flow within the gateway. The event data records are generated at various points in the gateway by using an aspect to weave code at compile time. Once generated, the EDRs can be picked up by an external listener and filtered based on various criteria, such as Java type-based filtering and classification. The listener can use predefined filtering coming from the gateway or customize the filtering according to specific needs. The EDRs can also be classified by using a configuration file, which can be modified without altering any programming code within the gateway.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a server or a router. Furthermore, it can also be apparent to those skilled in the art that such components, regardless of how they are combined or divided, can execute on the same computing device or can be distributed among different computing devices connected by one or more networks or other suitable communication means.

In accordance with the embodiments of the invention, there are provided mechanisms and methods for using aspects to generate event data records (EDRs). The EDRs can be generated in a gateway or some other type of software program. In various embodiments, cross-cutting concerns can be applied in generating the EDRs. Once generated, the EDRs can be classified into various categories, such as by using a configuration file that can be easily modified. This allows a user to change the EDR classifications without altering any programming code. Various EDR listeners can also be provided for registering and filtering EDRs as they are generated. For example, an external EDR listener can either use predefined filtering coming from the gateway or customize the filtering according to its specific needs. Furthermore, type-based filtering and classification can be implemented. Java classes and exceptions can be grouped and filtered into categories by using the Java class hierarchy. This element of the filtering allows grouping relevant or similar events. For example, the exceptions and therefore failures can be treated as a crosscutting concern. This can allow isolating and handling failures based on the package and class hierarchy of the exception after the code has been written. For example, this feature can enable specialized handling of all database related exceptions and than sub-categorizing that into connection related failures vs. failures related to the constraints of the data schema. Examples with java.sql package, java.sql.SQLException, and java.sql.SQLRecoverableException are illustrative. Separating database failures from connection failures to other external systems, or from internal traffic processing failures is another example. One could then differentiate how each type of failure is handled and what external monitoring systems are notified.

In various embodiments, the EDRs can be generated within a telecommunication service access gateway. The service gateway can be an intermediary entity deployed by a telecommunications provider for managing access by various applications to the subscriber network and to the various subscriber clients of the provider. During the processing of various communications between the subscribers and the service provider applications, gateways often need to generate records, such as event data records (EDRs), charging data records (CDRs), alarms and the like. In the past, the code used to generate these types of records has been hard-coded into the system as part of the interface or class used within the gateway. However, because the gateway can be deployed by multiple network operators with different business requirements, and can be accessed by multiple external third party applications, such hard-coding can be inefficient when a change to the record generating functionality is desired. Accordingly, in various embodiments, an aspect can be used in conjunction with the event data record (EDR) service in order to generate the records within the gateway. The aspect can perform this by weaving the EDR generating code into the various portions of the gateway interfaces.

As such, cross-cutting concerns can be applied to generate the EDRs. Cross-cutting concerns are those elements of the computer program which affect other functionality in the program and thus cannot be easily separated from the rest of the system. Some examples of such cross-cutting concerns include, but are not limited to, usage statistics, policy enforcement and tracing. In order to apply these cross-cutting concerns when generating EDRs, a set of aspects can be applied at build or compile time in order to weave byte code of previously compiled packages into various portions of the gateway. Subsequently, EDRs can be generated at runtime when requests are processed at these locations in the gateway.

In various embodiments, the weaving can be based on Java annotations associated with various methods or callbacks that are invoked within the gateway. For example, methods which are annotated with the "@Edr" annotation can be woven by the aspect, while methods that lack any annotation can be skipped. The aspect can also catch exceptions that are thrown out of the invoked methods within the gateway interfaces. In addition, the aspect can weave calls to a specific interface.

The aspect weaving in conjunction with the EDR service can enable users and developers to specify which type of EDR is generated at which particular point in the gateway flow, to filter and categorize EDRs, and to perform customized functionality based on the generated EDR. For example, an external EDR listener can be provided, which listens to the various EDRs generated within the gateway. This EDR listener can either use the predefined filtering coming from the gateway or customize the filtering according to its specific needs.

In the field of software development, aspect oriented programming (AOP) is a well known concept used to help the programmer with the separation of concerns in a software application. It is generally desirable to break down the application into distinct parts (e.g. modules) that do not overlap (or overlap as little as possible) in functionality. This is in part due to the fact that changes to the application are significantly easier and less complex to implement when each module can be modified and recompiled separately, without affecting the entire program. However, some concerns "cross-cut" across many different portions of the application and as such they are not easily encapsulated into independent entities. For example, logging can be a cross-cutting concern because it usually affects multiple logged parts of a system.

In order to deal with such concerns, several aspect oriented programming languages have been developed in the marketplace. AspectJ is one example of such a language developed at XEROX Palo Alto Research Center (PARC). AspectJ encapsulates cross-cutting concerns in one place and can be used with the embodiments described herein. It should be noted, however, that other aspect oriented languages can also be used and that the various embodiments of the present invention are not limited to AspectJ.

In various embodiments described herein, an aspect is a class that encapsulates cross-cutting concerns. The aspect can alter the behavior of underlying code. In one embodiment, the aspect weaves in EDR-generating code into various locations of the gateway. In order to differentiate the EDRs, the aspect can use information such as the direction of the request, the interface location and other attributes. As a non-limiting example, EDRs can be generated automatically by an aspect in the following locations:
  a. Before and after any method annotated with annotation "@Edr";
  b. Before and after calls to the Java method invocations that target an object implementing a specific interface (e.g. PluginNorthCallback interface); and/or
  c. After any exception is thrown.

In various embodiments, aspects can be used to generate EDRs in a network gateway application built on top of an application server. The gateway can be, for example, a policy driven telecommunications web services gateway that allows granular control over access to network resources from untrusted domains. In one embodiment, the gateway can be an application deployed by a telecom provider in order to manage access to its network by the third party services that are offered to the various subscribers of the telecom provider. It should be noted, however, that the gateway is described purely for purposes of illustration and that the various embodiments described herein are not limited to any particular type of software application.

In various embodiments, as events are automatically generated by the aspect, they can be transmitted outside of the gateway, where the EDRs can be picked up by a listener. The listener can filter the EDRs based on various criteria, categorize the EDRs, as well as perform various functionality depending on the information captured by the EDRs. This provides an ability for the telecommunication provider to implement customized functionality based on the call flow within the gateway. For example, if the provider wished to bill a client when the call reaches at a particular point within the gateway, it could use the listener categorization mechanism to denote events at that particular point as CDRs. Furthermore, the gateway code and plug-ins would not need to be altered in order to perform certain types of customized functionality. Therefore, the developer is allowed to categorize EDRs as alarms, charging data records (CDRs) or as plain undesignated EDRs. It should be noted that in the past, CDRs, alarms and EDRs were all distinct events with no particular relation to each other. In the present embodiments, on the other hand, every event can be expressed as an EDR. It is only the interpretation of this general EDR that will categorize it into a more specific CDR, Alarm or plain EDR. For example, an extensible markup language (XML) configuration file can be used in order to define which EDR will be considered a CDR and which will be considered an alarm, etc.

As illustrated below, the figures and their associated descriptions show the use of aspects to generate EDRs and the service access gateway within various contexts. It should be noted, however, that the components illustrated in the figures are not intended to limit the scope these embodiments and are provided purely for purposes of illustration and explanation.

Figure 1:
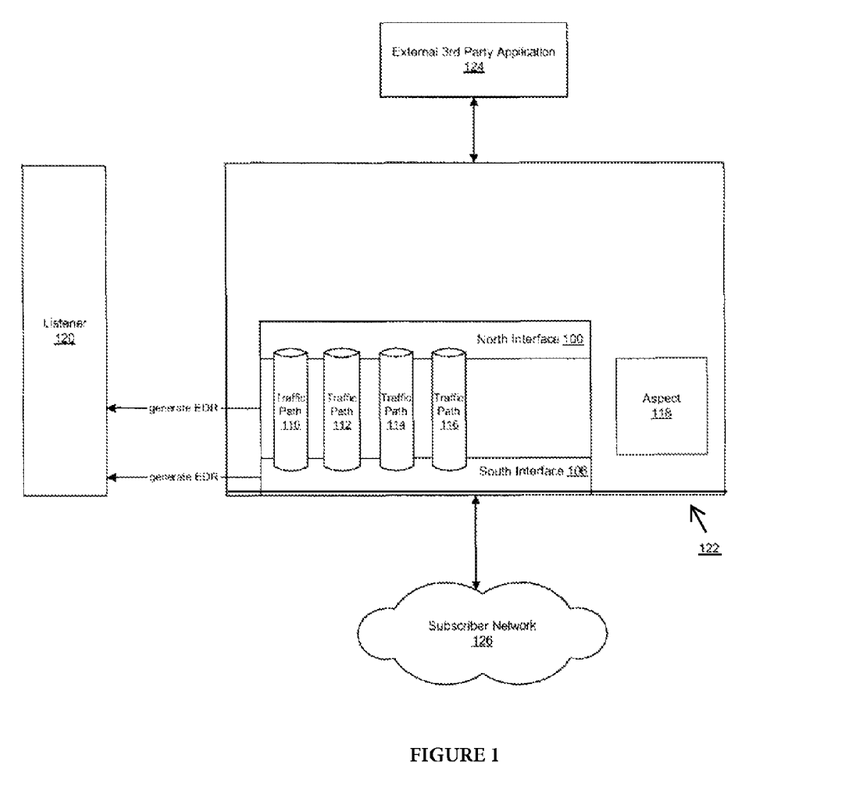
FIG. 1 is a system-level illustration of EDR generation, in accordance with various embodiments.

FIG. 1 is a system-level illustration of EDR generation, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the network gateway 122 can be deployed by a telecommunications provider in order to manage the interactions between its subscriber network 126 and the third party external service provider applications 124. As an illustration, the external application could provide a text voting feature where the subscribers of the telecom provider can text a vote on a specific topic by using their mobile device. Many other such external third party applications are possible and the present disclosure should not be limited in any way to any specific type of application.

The service access gateway 122 can include one or more traffic paths 110, 112, 114, 116 between the application and the various subscriber devices. The traffic path can be a basic functional unit of the network gatekeeper. In one embodiment, the traffic path is comprised of a service type (Short Messaging, User Location, etc.), an application-facing "north" interface 100, and a network-facing "south" interface 106. A request for service enters through one interface, is subjected to internal processing, including evaluation for policy and protocol translation, and is then forwarded using the other interface.

The aspect 118 can weave methods, callbacks and exceptions, so that appropriate EDRs will be generated as requests are being processed in the various traffic paths of the gateway 122 network tier. For example, the following table illustrates one possible implementation (among many) of weaving the various invocations within the gateway by the aspect:

| Trigger | When | Modifiers restrictions | What is woven |
| --- | --- | --- | --- |
| Method | Before executing | Public method only | Only in methods annotated with @Edr |
| Method | After executing | Public method only | Only in methods annotated with @Edr |
| Method-call | Before calling | Any method | Only for method call to a class implementing the Plug-in North Callback interface (EJB callback) |
| Method-call | After calling | Any method | Only for method call to a class implementing the Plug-in North Callback interface (EJB callback) |
| Exception | After throwing | Any method | Any exception thrown except in methods annotated with @NoEdr |

As the EDRs are generated by the gateway, they can be sent to an external listener 120. In one embodiment, the gateway itself filters the EDRs by marking them with an appropriate tag (e.g. if they are categorized as an alarm, CDR or plain EDR). For example, an internal listener within the gateway can dispatch the EDR to a Java Messaging Service (JMS) distributed topic so that the external client can receive the EDR. Thus, external listeners can subscribe to the JMS topic in order to receive the stream of generated EDRs from the gateway. This default gateway filtering can also be modified by a user, such as by changing the configuration file, without having to alter any code within the gateway.

In one embodiment, the EDRs can be categorized into one or more of: CDRs, alarms, and general events. General events are expected system occurrences that are of importance to the operator, but do not need corrective action. Alarms are system occurrences that are unexpected and may require corrective action. Charging events are the basis for CDRs, the records that provide the information needed to charge for services. As such, rather than having multiple types of separate and unrelated objects for each construct (CDR, alarm, etc.), the gateway can instead generate one type of object—EDR—which can then be categorized as one of these constructs.

In one embodiment, to categorize the EDR objects as EDRs, alarms, or as CDRs, a set of extensible markup language (XML) configuration files can be used. For example, an "edr.xml" file can contain descriptors that describe which EDR object(s) should be considered as an EDR. An "alarm.xml" file can contain descriptors that describe which EDR object(s) should be considered as an alarm. Similarly, "cdr.xml" file can contain descriptors that describe which EDR object(s) should be considered as a CDR. The configuration file can contain a filter element and a data element that defines what data is to be added to an EDR if it is matched by the filter element. In other possible embodiments, other types of configuration files can be implemented in order to categorize the EDRs, as will be apparent from this disclosure to one of ordinary skill in the art. Based on the categorizing and filtering, customized functionality can be performed, such as billing, error detection, statistics and other desirable functions.

In one embodiment, when an EDR is generated by the aspect, it contains the following values: Class name, method name, direction (south, north), position (before, after), interface (north, south), and source (method, exception). In addition to these values, the EDR can also contain any custom values that can be added to it. In various embodiments, values can be added by using parameter annotations or a designated method(s), and stored in the RequestContext. In one embodiment, the RequestContext is an object that contains metadata associated with the requests being processed within the gateway. The RequestContext can be specifically designed to be used by plug-ins to make values available during a request. It can be automatically created by the aspect when a request (thread) enters the north or south interface and destroyed when the thread of the request terminates. In one embodiment, when using annotations to add values, two parameter annotations can be used, such as @ContextKey and @ContextTranslate. An example of a method that uses these parameters is shown in the following table:

```
@Edr
Public @ContextKey("correlator") String
playTextMessage(@ContextKey("address")
URLaddress) {
Return correlator;
}
```

The method illustrated above declares that the first parameter "address" should be put into the current RequestContext under the name "address" and that the returned value "correlator" should be put into the current RequestContext under the name correlator.

The values can also be added to the RequestContext by using a designated method such as putEdr( ) in the application programming interface (API) of the gateway plug-in. Accordingly, in one embodiment, when an EDR is generated from an aspect, all values that have been put into the current RequestContext by using the designated method(s) are included in the EDR. An example of this is illustrated below:

```
...
RequestContext ctx = RequestContextManager.getCurrent( );
ctx.putEdr("address", "tel:1234"); // this
value would be part of any EDRs generated
ctx.put("foo", "bar"); // this value would not be part of any EDRs
...
```

In various embodiments, a context translator interface can also be used to translate complex objects. The translator can extract the relevant information from the complex object based on the parameter. The context translator class specified in the @ContextTranslate annotation can be automatically instantiated by the aspect when needed. For example, the translator can be a class implementing the ContextTranslator interface shown below:

```
public class ACContextTranslator implements ContextTranslator {
    public void translate(Object param, ContextInfo info) {
        if (param instanceof PlayTextMessage) {
            PlayTextMessage msg = (PlayTextMessage) param;
            info.put ("address", msg.getAddress( ).toString( ));
        }else if (param instanceof PlayTextMessageResponse) {
            PlayTextMessageResponse
            response = (PlayTextMessageResponse) param;
            info.put ("correlator", response.getResult( ));
        ...
        }
    }
}
```

In various embodiments, when implementing a listener for the EDRs, two objects can be received from the gateway as the EDRs are generated. The first object is EDRData, which is the EDR itself. The second object is an EDRConfigDescriptor, which is the descriptor that matched the EDR and is built using the values found in the appropriate XML configuration file (edr.xml, alarm.xml, cdr.xml). While most of the values for the EDR can be available through the EDRData object, some values may be accessible in the descriptor. For example, the identifier, description, severity of the alarm or custom values from the data section can be available in the descriptor object.

In various embodiments, in order to make a plug-in able to take advantage of the aspect EDR, the plug-in objects should be registered with the appropriate managed plugin and/or plug-in managers. In one embodiment, the plug-in manager is a module in the gateway that is responsible for routing requests to the appropriate plug-in. The methods that are desired to be woven should then be annotated using an annotation, such as "@Edr". The specific arguments that are desired to be contained in the EDR should be annotated for each of the annotated methods. In addition, the configuration file should be modified to add all of the EDRs that are being triggered.

Figure 2:
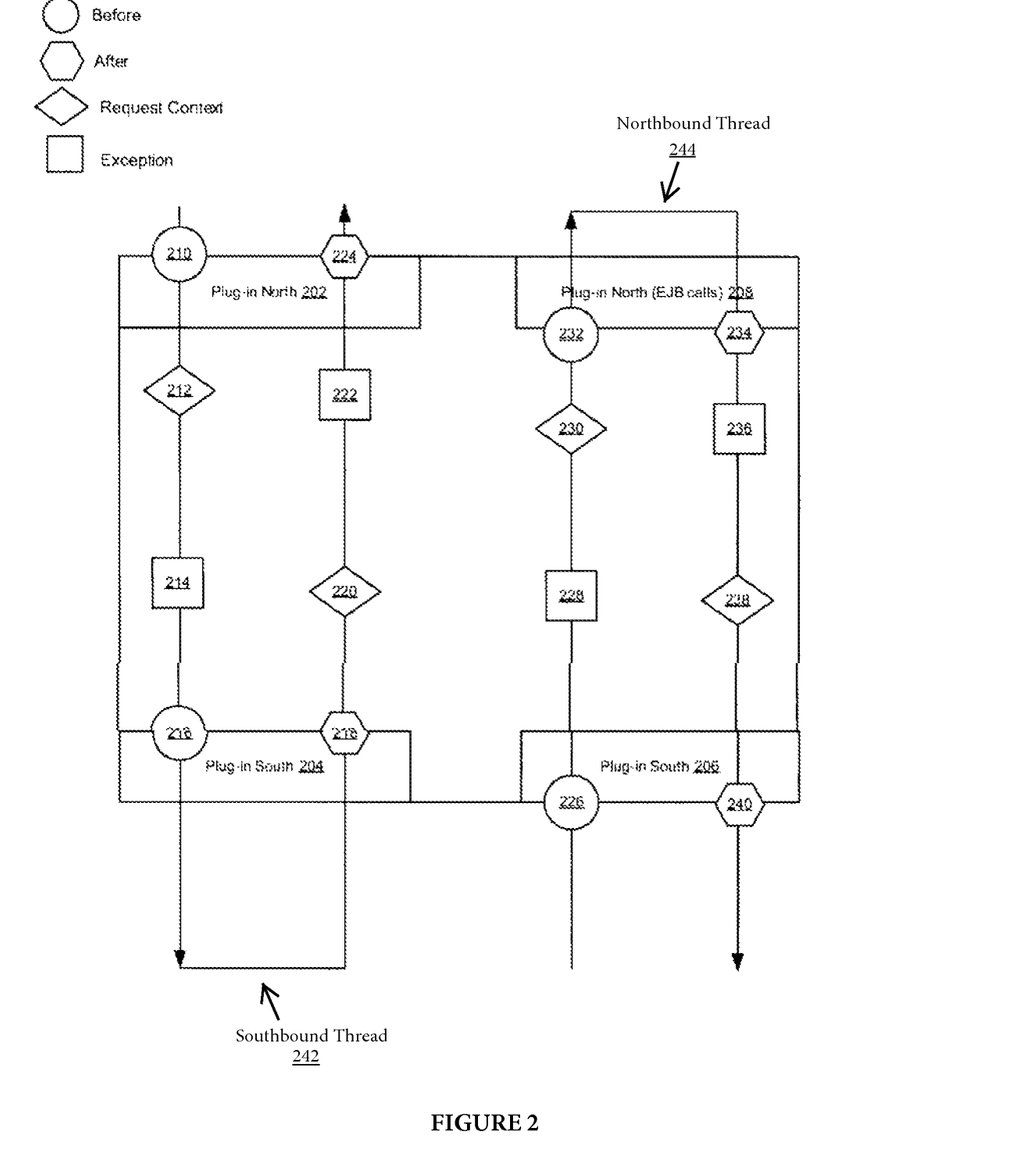
FIG. 2 is another illustration of EDR generation, in accordance with various embodiments.

FIG. 2 is another illustration of EDR generation, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, event data records can be generated at various points during the processing in the gateway. For example, in the southbound thread 242, an invocation is received from an external service providing application. The method can be invoked and return, as shown in the illustration. In the northbound thread 244, on the other hand, the message is received from a mobile client in the subscriber network. The function of the south plug-ins 204, 206 and the north plug-ins 202, 208 can be to translate the communications into the appropriate protocols suitable for communication. For example, the application may communicate in Web Services, while the network communications may need to be translated into Parlay Gateway protocol or some other language. The plug-ins can perform the translation processing needed to enable a converged platform and services.

As shown in the illustration, the aspect can generate EDRs in the southbound thread 242 before a method is invoked (210, 216) in the plug-in, after a method is executed (218, 224), after an exception is thrown (214, 222). Furthermore, all EDRs generated in the same thread will contain the information put into the Request Context (212, 220), as previously described. Similarly, in the northbound thread 244, EDRs can be generated before annotated methods are invoked (226, 232), after their execution (234, 240), after throwing exceptions (228, 236) and may also contain information placed in the Request Context (230, 238).

In one embodiment, when throwing exceptions, an EDR can be generated for the first throw occurrence and need not be re-generated as the exception is propagated within the gateway. In some cases, multiple exceptions may be thrown, causing multiple EDRs to be generated.

Figure 3:
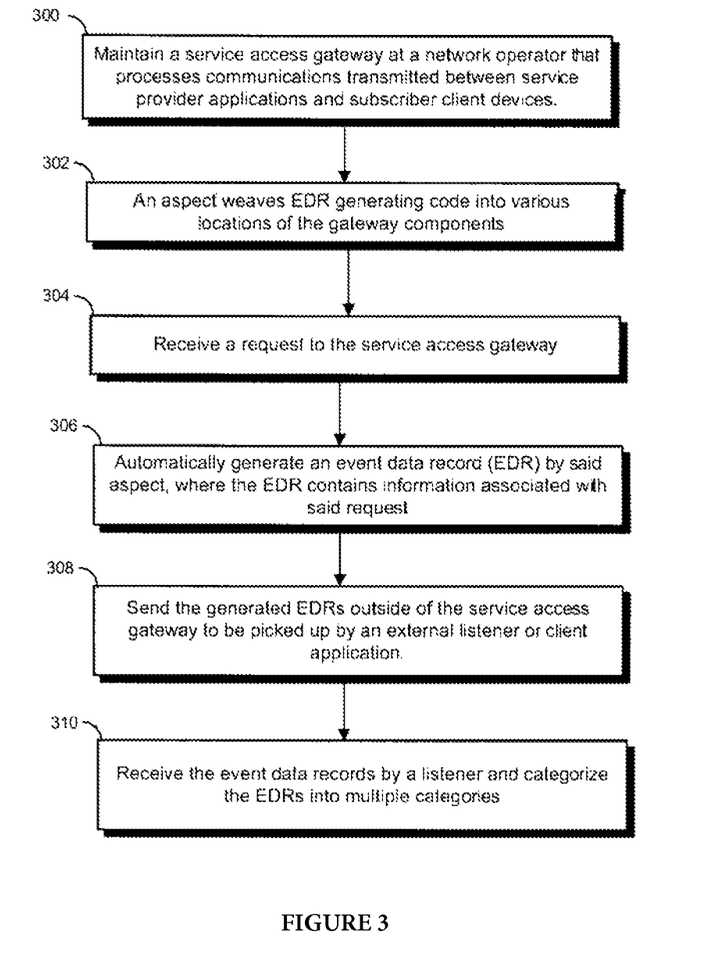
FIG. 3 is an example flow chart diagram of the aspect generated EDR process, in accordance with various embodiments.

FIG. 3 is an example flow chart diagram of the aspect generated EDR process, in accordance with various embodiments. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. It will also be apparent that certain steps can be added to or omitted from the process without departing from the scope of the various embodiments.

As shown in step 300, a service access gateway can be maintained by a telecom network operator. The gateway can be used to process and control communications flow between external third party service provider applications and the internal network clients of the operator. One example of the gateway is the network gatekeeper, as previously described.

In step 302, an aspect is used to weave byte code into various locations of the gateway. In one embodiment, the aspect can alter the behavior of the gateway components by weaving in the packaged EDR-generating byte code. In step 304, a request is received to the service access gateway at runtime. In one scenario, the request is received from an external application. In another scenario, the request is received from the internal network element. In any event, EDRs can be automatically generated by the code previously weaved by the aspect, as shown in step 306.

In step 308, the generated EDRs can be sent outside of the service access gateway to be picked up by an external listener. In one embodiment, this is accomplished by publishing the EDR to a JMS topic. In step 310, the EDR can be picked up by the external listener and categorized into one of multiple categories (e.g. CDR, alarm, general event). Custom functionality can also be implemented according to the generated EDR.

Figure 4:
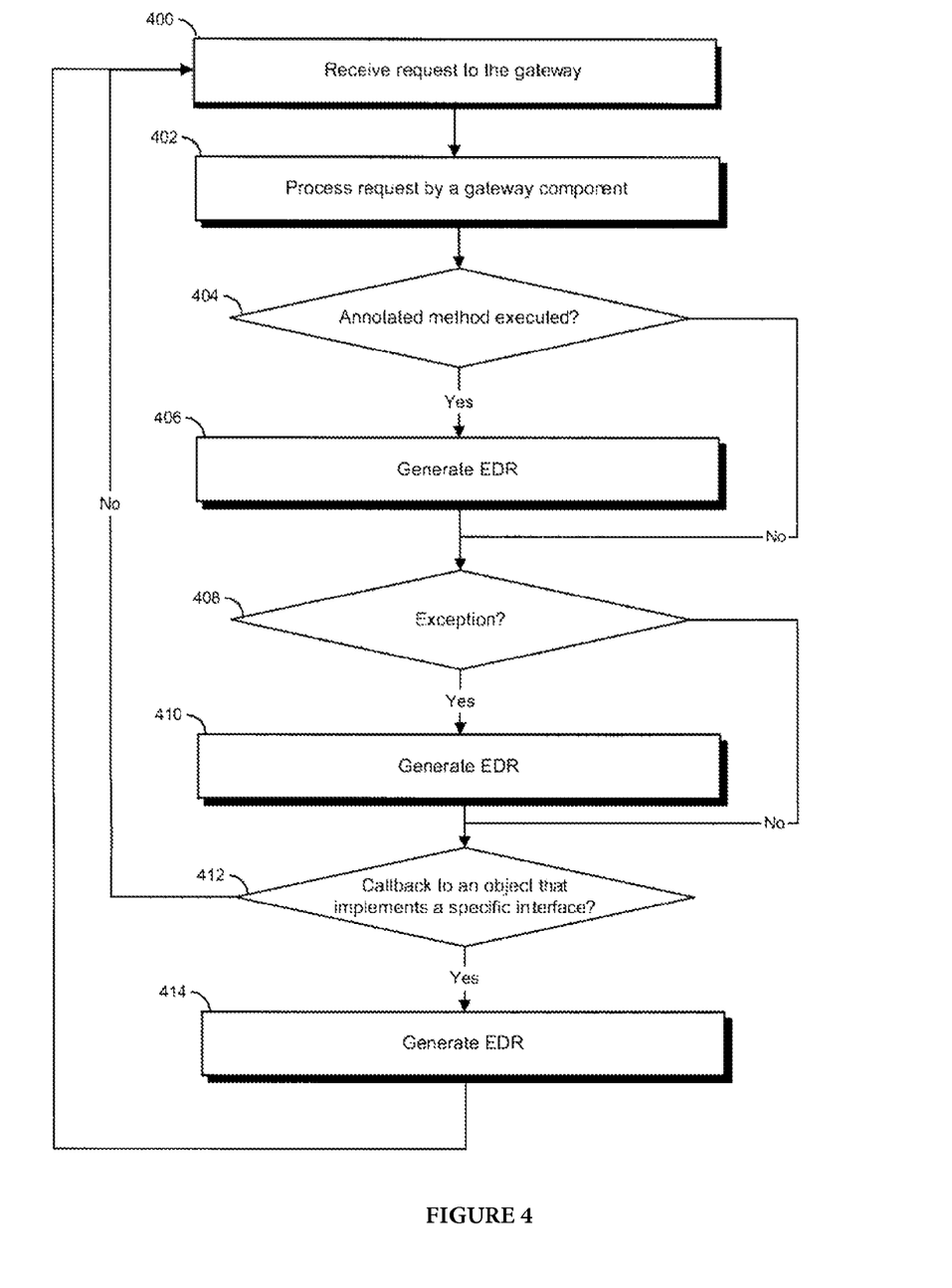
FIG. 4 is an example logical flow chart of generating the EDRs within the gateway, in accordance with various embodiments.

FIG. 4 is an example logical flow chart of generating the EDRs within the gateway, in accordance with various embodiments. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. It will also be apparent that certain steps can be added to or omitted from the process without departing from the scope of the various embodiments.

As shown in step 400, a request is received to the gateway. In step 402, the request can be processed by a gateway component, such as a plug-in. If the method being executed is annotated (step 404) by a designated annotation (e.g. "@Edr") the EDR is automatically generated (step 406) by the code previously weaved by the aspect. If the method is not annotated, the process continues. If an exception is being thrown (step 408), caused by some internal processing within the gateway, an EDR can be generated to reflect this occurrence, as shown in step 410. If the request is a callback to an object implementing a specific interface (step 412), the appropriate EDR can be generated, as shown in step 414. It should be noted that the various decisions illustrated here are placed in this order purely for purposes of illustration and can be rearranged according to any requirements and/or preferences of the gateway implementation.

In various aspects, the embodiments described throughout this specification encompass computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, virtual machines and user applications.

Included in the programming (software) of the general/specialized computer or microprocessor are software modules for implementing the teachings of the present invention, including, but not limited to providing mechanisms and methods for aspect generated EDRs, as discussed herein.

As previously described herein, the term application broadly includes any data entry, update, query or program that processes data on behalf of a user. Users may be human or computational entities. The term external application or third party application are used interchangeably and are intended to be broadly construed to mean any applications which reside outside of the gateway of the telecommunications provider and which provide a particular service to the subscribers of the provider. The term gateway is to be interpreted broadly to mean any software application or hardware that serves as an intermediary entity for processing requests between two or more other entities. The term subscriber device is intended to be broadly construed to be any mobile or other hardware devices that are connected to the gateway, including but not limited to cellular telephones, personal digital assistants (PDAs), laptops, personal computers.

As previously mentioned, the various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

The invention claimed is:

1. A system for use with a telecommunications service gateway, for applying cross cutting concerns to generate event data records, said system comprising:
   one or more micro-processors;
   a gateway executing on the one or more micro-processors, wherein the gateway is operable to manage communications in the form of traffic paths between a subscriber network and one or more external applications, wherein the traffic paths enable requests for services to be received at a first interface, processed by the gateway, and then forwarded using a second interface;
   an aspect, on the gateway, that weaves byte code corresponding to annotated methods of appropriate event data records, into one or more specific locations of the gateway at build or compile time, to enable generation of those event data records as requests are being processed; and
   one or more event data records that are automatically generated at the time of processing those requests, through the gateway, which invoke on the annotated methods, by the byte code woven at said one or more specific locations within the gateway, wherein said event data records include data associated with the requests.

2. The system of claim 1, further comprising:
   a configuration file used to classify said one or more event data records, wherein the configuration file is modifiable such that the event data records classification is customized without altering any programming code in said application.

3. The system of claim 1, wherein type-based classification is employed for the event data records, such that Java classes and exceptions are grouped into categories by using a Java class hierarchy in order to allow grouping two or more relevant events.

4. The system of claim 1, further comprising:
   a listener deployed externally with respect to the application for filtering event data records generated by the aspect, wherein said listener uses at least one of the following:
   predefined filtering received from said application; and
   customized filtering defined at said listener.

5. The system of claim 1, wherein automatically generating the event by said aspect further includes:
   weaving one or more methods within the application by the aspect, said one or more methods being annotated with an annotation, wherein the aspect generates event data records only for methods that have been annotated with said annotation.

6. The system of claim 1, wherein automatically generating the event by said aspect further includes:
   catching one or more exceptions thrown by any method and generating an event data record after the exception is thrown.

7. The system of claim 1, wherein automatically generating the event by said aspect further includes:
   determining that a callback has been invoked to an object implementing a specific interface and generating the event data record at the time the callback has been invoked.

8. The system of claim 1, wherein the event data record further includes information regarding one or more of:
   class name, method name, direction of the request within the application, position with respect to a method invocation, interface of the application, or the source of the event generation.

9. The system of claim 1, wherein one or more values are added to the event data record by using parameter annotations.

10. The system of claim 1, wherein one or more event data records constitute at least one of: a charging data record (CDR), an alarm and a general event.

11. A method for using aspects to generate event data records in a telecommunications service gateway, said method comprising:
    maintaining a gateway that manages communications in the form of traffic paths between a subscriber network and one or more external applications, wherein the traffic paths enable requests for services to be received at a first interface, processed by the gateway, and then forwarded using a second interface;
    employing an aspect to weave byte code corresponding to annotated methods of appropriate event data records, into one or more specific locations of the gateway at build or compile time, to enable generation of those event data records as requests are being processed;

receiving a request to the gateway which invokes on the annotated methods; and automatically generating an event data record by said byte code woven at said one or more specific locations within the gateway at the time of processing said request, through the gateway, said event data record including information associated with said request.

12. The method of claim 11, further comprising:

transmitting one or more generated event data records outside of the application; and receiving the one or more event data records by a listener.

13. The method of claim 11, further comprising:

filtering the one or more event data records received by the listener wherein said listener uses at least one of the following:
predefined filtering received from said application; and
customized filtering defined at said listener; and
invoking customized functionality based on the filtering.

14. The method of claim 11, further comprising:

providing a configuration file to classify event data records, wherein the configuration file is modifiable such that the event data records classification is customized without altering any programming code in said application.

15. The method of claim 11, further comprising:

categorizing the one or more event data records as at least one of: charging data records (CDRs), alarms, and general events.

16. The method of claim 11, wherein automatically generating the event by said aspect further includes:

weaving one or more methods within the application by the aspect, said one or more methods being annotated with an annotation, wherein the aspect generates event data records only for methods that have been annotated with said annotation.

17. The method of claim 11, wherein automatically generating the event by said aspect further includes:

catching one or more exceptions thrown by any method and generating an event data record after the exception is thrown.

18. The method of claim 11, wherein automatically generating the event by said aspect further includes:

determining that a method call has been invoked to an object implementing a specific interface and generating the event data record at the time the method call has been invoked.

19. A non-transitory computer-readable storage medium storing one or more sequences of instructions for using aspects to generate event data records in a telecommunication gateway, which instructions, when executed by one or more processors, cause the one or more processors to carry out the steps comprising:

maintaining a gateway that manages communications in the form of traffic paths between a subscriber network and one or more external applications, wherein the traffic paths enable requests for services to be received at a first interface, processed by the gateway, and then forwarded using a second interface;

invoking an annotation associated with a call-back;

employing an aspect, on the gateway, that weaves byte code corresponding to annotated methods of appropriate event data records into one or more specific locations of the gateway at build or compile time, to enable generation of those event data records as requests are being processed;

receiving a request to the gateway which invokes on the annotated methods; and automatically generating an event data record by said byte code woven at said one or more specific locations within the gateway at the time of processing said request through the gateway, said event data record including information associated with said request.

* * * * *

UNITED STATES PATENT AND TRADEMARK OFFICE
CERTIFICATE OF CORRECTION

| | | |
|---|---|---|
| PATENT NO. | : 8,850,412 B2 | |
| APPLICATION NO. | : 12/466207 | |
| DATED | : September 30, 2014 | |
| INVENTOR(S) | : Bovet et al. | |

It is certified that error appears in the above-identified patent and that said Letters Patent is hereby corrected as shown below:

In the Specification

In column 3, line 55, delete "and than" and insert -- and then --, therefor.

In column 8, line 20, delete "instanceof" and insert -- instance of --, therefor.

In column 8, line 23, delete "instanceof" and insert -- instance of --, therefor.

Signed and Sealed this
Twenty-eighth Day of April, 2015

Michelle K. Lee
*Director of the United States Patent and Trademark Office*